United States Patent
Qian

(10) Patent No.: US 6,842,490 B1
(45) Date of Patent: Jan. 11, 2005

(54) VITERBI DECODER WITH ADAPTIVE TRACEBACK

(76) Inventor: Feng Qian, 25851 Majorca Way, Mission Viejo, CA (US) 92692

(*) Notice: Subject to any disclaimer, the term of this patent is extended or adjusted under 35 U.S.C. 154(b) by 743 days.

(21) Appl. No.: 09/686,675

(22) Filed: Oct. 11, 2000

(51) Int. Cl.⁷ .............................. H03D 1/00; H04L 23/02
(52) U.S. Cl. ........................................ 375/262; 375/341
(58) Field of Search ................................ 375/262, 265, 375/341, 261, 340, 316; 714/792, 794, 795, 796

(56) References Cited

U.S. PATENT DOCUMENTS

| | | | | |
|---|---|---|---|---|
| 5,784,392 A | * | 7/1998 | Czaja et al. ................ | 714/786 |
| 6,094,739 A | * | 7/2000 | Miller et al. ................ | 714/792 |
| 6,324,226 B1 | * | 11/2001 | Sasagawa ................... | 375/341 |
| 6,452,985 B1 | * | 9/2002 | Hatakeyama et al. ....... | 375/341 |
| 6,647,530 B1 | * | 11/2003 | Kamada ..................... | 714/792 |
| 6,651,215 B2 | * | 11/2003 | Miyauchi et al. ........... | 714/795 |

* cited by examiner

Primary Examiner—Young T. Tse
Assistant Examiner—Sam K. Ahn
(74) Attorney, Agent, or Firm—Duane Morris LLP

(57) ABSTRACT

In a convolutional decoder using partial traceback, L−1 data bits of a traceback beginning at a time step T are stored, where L is the traceback length; these L−1 data bits are the data bits corresponding to the L−1 time steps backwards from time step T. The maximum likelihood encoder state for time T is also saved. (The L-th data bit is the desired data bit as in conventional convolutional decoders.) In a subsequent partial traceback preferably beginning at time T+1 that ends at time step T, the maximum likelihood encoder state for time T determined from the partial traceback is compared with the stored encoder state for time T. If they correspond to the same encoder state, the L−1 stored data bits are designated as the last L−1 data bits of the current (partial) traceback.

10 Claims, 4 Drawing Sheets

VITERBI DECODER WITH ADAPTIVE TRACEBACK

BACKGROUND OF THE INVENTION

1. Field of the Invention

This invention relates to a method and apparatus for decoding convolutionally encoded signals. Such signals are commonly used in communications and recording systems that employ error correction to combat signal corruption.

2. Description of the Related Art

One increasingly popular redundant coding scheme used in wireless and other types of communications systems is convolutional coding, in which the coding of particular symbol depends upon the value of that symbol and the value of a certain number of symbols preceding and succeeding that particular symbol.

It would be desirable to improve upon conventional maximum likelihood sequence estimation ("MLSE") decoders such as Viterbi decoders, which are commonly used to decode convolutionally encoded data. If $s_k$ is a vector that represents an actual transmitted sequence of symbols and r is a vector that represents the actual signals received by a mobile, a Viterbi decoder effectively tests all of the possible values of $s_k$ and selects the $S_k$ that maximizes the summation ("cross correlation") $\Sigma_n \, c[n]r[n]s_k[n] = s_k^T C r$, where c[n] defines the channel gain for a transmitted symbol for sample n (and thus C is a diagonal matrix with these values). (The $s_k$ that maximizes the cross correlation is the $s_k$ that minimizes the "distance" between r and $s_k$.) For more details regarding Viterbi decoders, see, for example, "Digital Communications", John G. Proakis (3-d edition 1995).

The best $s_k$ may be represented as a path through nodes in a diagram (known as a trellis), where lines ("transitions") between nodes in adjacent time steps represent whether an input symbol (information bit) was a 0 or a 1 (for binary coding). The nodes ("states") in vertical columns represent the values of prior input symbols. A "path" through the trellis therefore represents a particular sequence of input symbols. FIG. 1 shows an example of a trellis with only two paths shown. The time steps indicate a decoder trellis beginning at time t=0 to time t=. At each time step, the decision units of the decoder contain the value of the cross correlation of the most likely path to the state of interest. Thus, the decoder trellis contains multiple paths from an initial state to a given state several time steps later.

However, only one path has the highest cross correlation and is the most likely path. The most likely path to a particular state within a given time step is found by starting at that particular state at that given time step and tracing backward (a "raceback") along the chosen transitions. Information bits that correspond to the transitions along the path are the decoded data. An information bit equal to 0 is shown is a solid line; an information bit equal to 1 is shown as a dotted line. Thus, the path shown in FIG. 1 ending at state A at time t=0 corresponds to an information bit sequence equal to 0100.

A weight is computed for each state at each time, where the weight for a particular state at a particular time corresponds to the likelihood that the encoder was in that state at that time. The weight is equal to the weight of a previous state that transitioned to the current state plus a weight based upon the likelihood of the transition. For example, node 10 at time t=has a metric of four which equals the weight of node 12 at time t=3 plus the weight for the transition between those nodes. The node at any given time with the highest weight is the node that ends the most likely path and is therefore the node from which the traceback will occur.

To achieve good noise performance from the decoding process, the traceback length must generally be several times the constraint length (the number of input bits upon which an output depends; this is the length of a shift register that may be used to perform the encoding) of the code. In current code division multiple access ("CDMA"), a traceback length L=5*K, where K is the constraint length, is frequently taken as the minimum acceptable traceback length.

For a decoder with bits of memory, M−L valid bits can be obtained after each traceback. If an incoming data frame consists of N information bits (assumed to be greater than M), the number of L bit tracebacks is (N−K)/(M−L), which corresponds to a computation requirement of M*(N−K)/(M−L), where a computation is assumed to be a one bit traceback. (The one bit traceback is used simply as a "yardstick.") If M=L+1, this equation reduces to (L+1)*(N−K), which corresponds to the smallest memory and the greatest computational overhead.

Instead of performing periodic, partial tracebacks, if the decoder memory is sufficiently large, an entire incoming data frame may be stored and a full traceback of length (N−K) performed. Thus the full traceback is less computationally intensive than the periodic traceback scheme by a factor of M/(M−L). However, larger memories (greater M) are costly.

It would be desirable to implement the partial traceback scheme, with its smaller memory requirement, while at the same time decreasing its computational overhead.

SUMMARY OF THE PRESENT INVENTION

These and other needs are met by the present invention, which provides a method and apparatus for decoding transmitted data that has been generated by encoding information data with a convolutional encoder that generates convolutional codes based on an input sequence of data, where the encoder has a constraint length K and a rate k/n.

According to an embodiment of the present invention, L−1 data bits of a traceback beginning at a time step T are stored, where L is the traceback length; these L−1 data bits are the data bits corresponding to the L−1 time steps backwards from time step T. The maximum likelihood encoder state for time T is also saved. (The L-th data bit is the desired data bit as in conventional convolutional decoders.) In a subsequent partial traceback, preferably beginning at time T+1 that ends at time step T, the maximum likelihood encoder state for time T determined from the partial traceback is compared with the stored encoder state for time T. If they correspond to the same encoder state, the L−1 stored data bits are designated as the last L−1 data bits of the current (partial) traceback.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

The MLSE decoder that is described is a Viterbi decoder but the invention may be applied to any type of MLSE decoder.

General System Description

Figure 2:
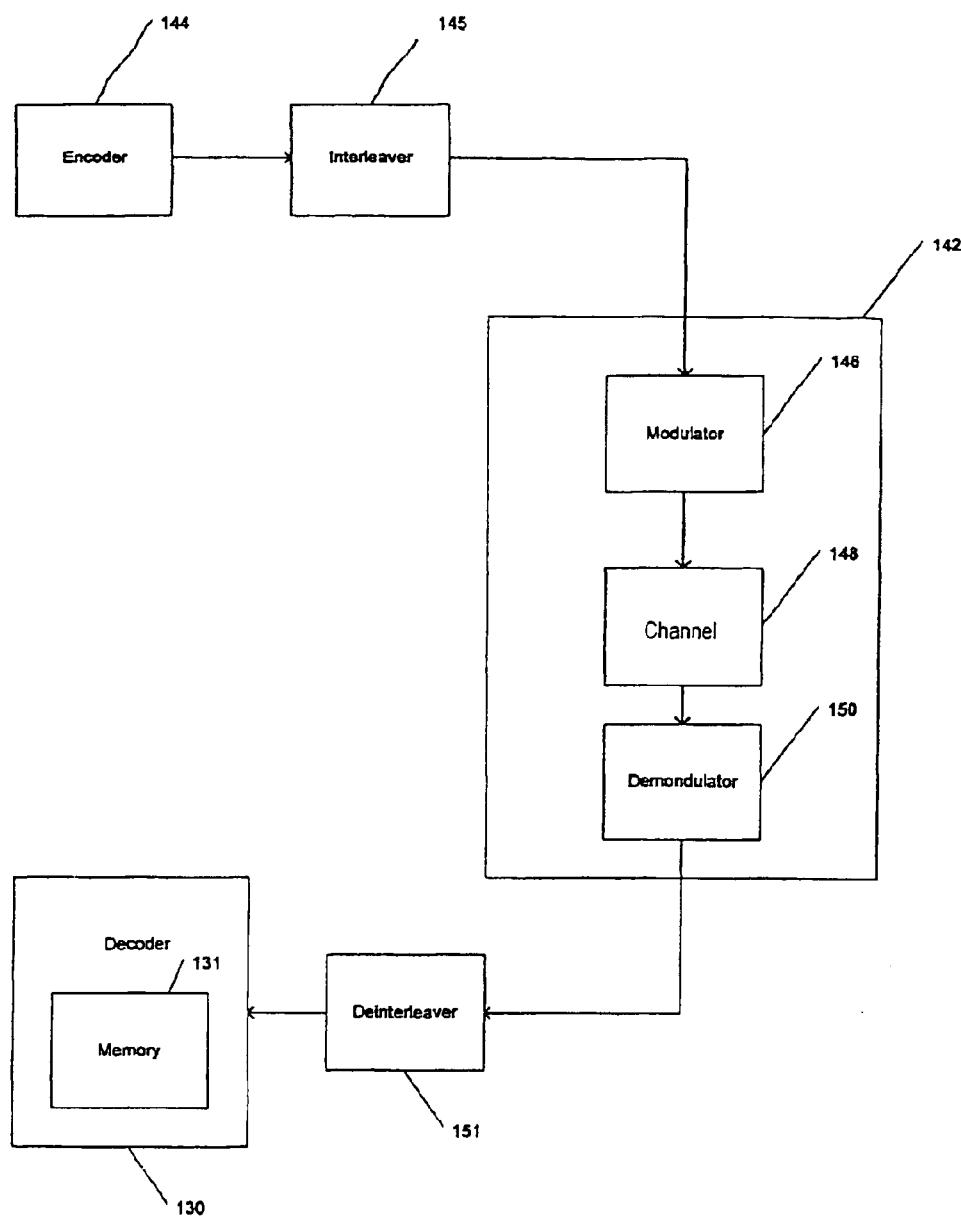
FIG. 2 represents a digital communications system, in which a convolutional decoder including the present invention may be used.

FIG. 2 represents a digital communications system 140 comprising a discrete-time channel 142 interposed between an encoder 144 and a decoder 130. Discrete-time channel 142 comprises a modulator 146, a channel 148 and a demodulator 150. An interleaver 145 is interposed between the encoder 144 and the modulator 146. A deinterleaver 151 is interposed between the decoder 130 and the demodulator 150. Channel 148 may be a transmission channel or a storage medium being written to and read from. Interleaver 145 receives a digital output signal from encoder 144 and interleaves this digital output signal over a certain time period, which is usually predetermined and known as a frame. Modulator 146 serves to translate the digital output signal from interleaver 145 into signals suitable for channel 148 and thereafter drives the signals across channel 148.

Channel 148 may suffer from interference that corrupts said signals, the interference possibly taking form in any combination of additive noise, cross channel interference, multi-path interference, and channel fading. Demodulator 150 serves to receive the signals from channel 148 while minimizing the interference as much as is practical, and thereafter translate the signals into digital signals for input to deinterleaver 151, which deinterleaves the digital signal and provides it to decoder 130. Discrete-time channel 142 can thus be viewed as a unit accepting digital input signals and producing possibly corrupted digital output signals although the present invention is not limited to noisy channels.

The decoder 130 has a memory 131.

Encoder 144 is a convolutional encoder which serves to add redundancy to input data signal 152. In particular, the encoder 144 comprises a shift register coupled to various arithmetic units (such as modulo 2 adders) that form n bits of output based on the bits in the shift register. For a simple shift register, where each shift of the register causes one bit to be shifted in and out of the register (i.e. each data bit is shifted to the next location in the register) each input bit corresponds to n bits of encoder 144 output and 1/n is known as the rate of the encoder 144. If the shift register has K elements, the K−1 most recent bits input into the encoder correspond to a state. K is known as the constraint length. For binary input data, there are therefore $2^{K-1}$ possible encoder states.

The added redundancy (n bits per information bit) allows for detection and correction of errors that may result from corruption of signals passing across discrete-time channel 142. The error detection and correction is performed by decoder 130.

Flow Chart of Operation

Figure 1:
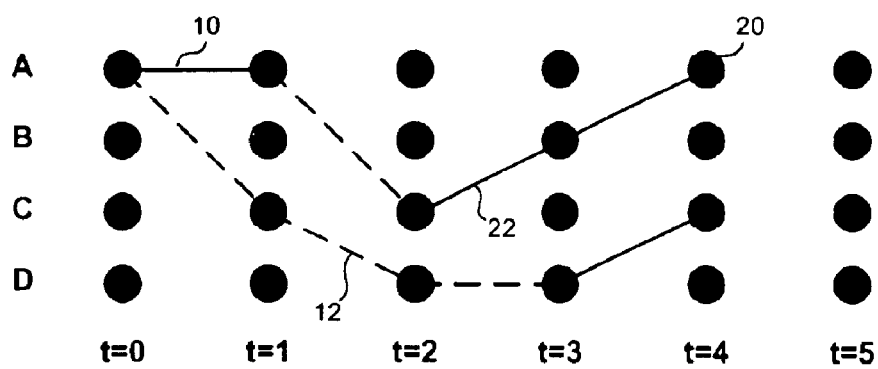
FIG. 1 is an example of a trellis diagram.
Figure 3:
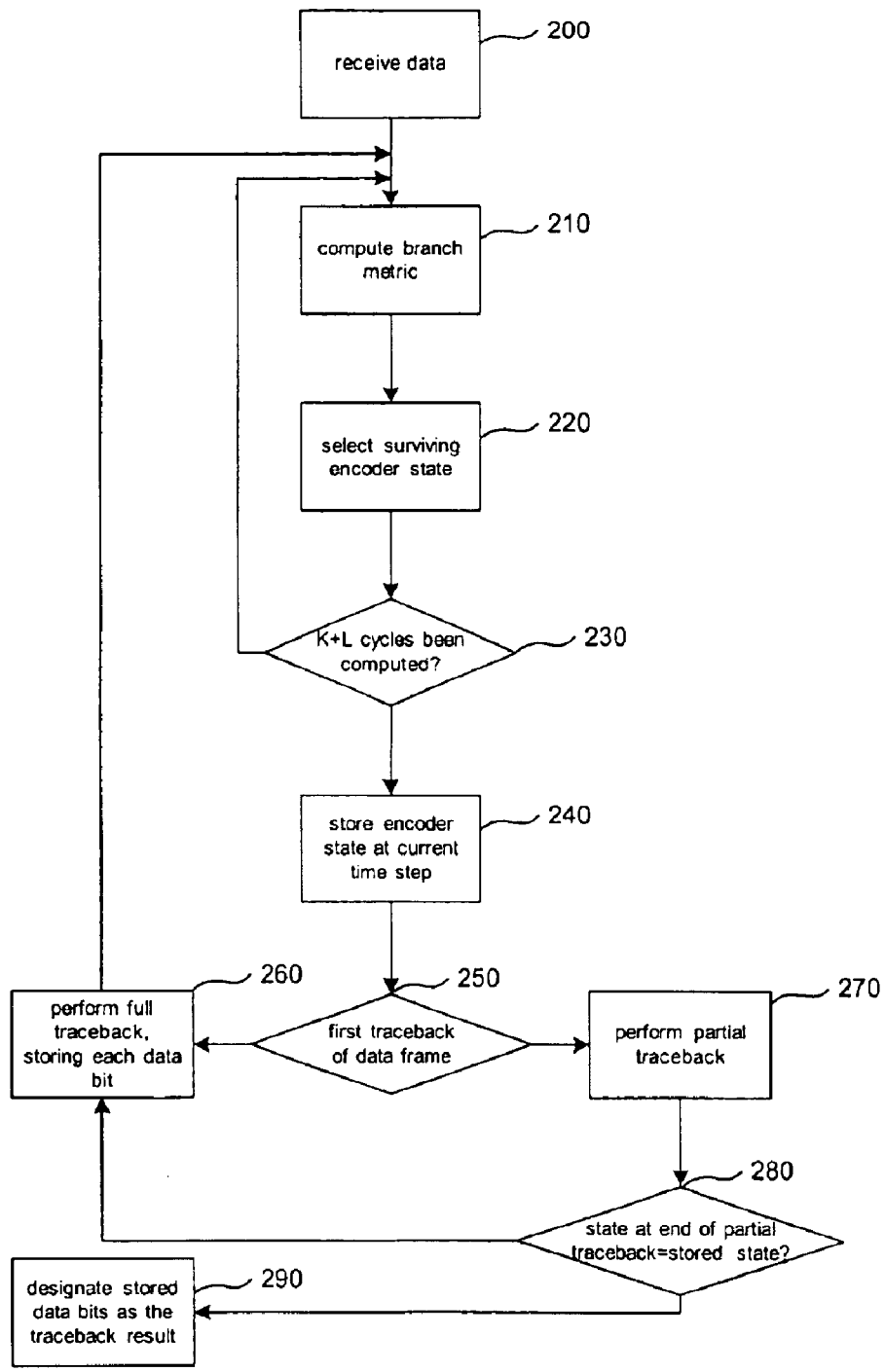
FIG. 3 is a flow chart that shows the operation of a possible embodiment of a convolutional decider constructed according to the teachings of the present invention.

FIG. 3 is a flow chart that details the traceback operation of the decoder 130. At block 200, the decoder 130 receives input data to be decoded. At block 210, the decoder 130 computes the current branch metric. This block is known in the art will not be further discussed. At block 220, the decoder 130 selects the surviving state. This block is well known in the art and will not be further discussed. At block 230, the decoder 130 checks whether L+K decoding cycles (i.e. one decoding cycle per time step) have occurred, where L is the traceback length and K is the constraint length. If not, control passes back to block 210. If so, control passes to block 240, where the decoder 130 stores the starting state of the traceback in the memory 131 (e.g., with reference to FIG. 1, the state A at time t=4).

At block 250, the encoder determines whether the traceback to be performed is the first traceback of the current data frame. If so, control passes to block 260, where a full traceback is performed. For each time step transition within the traceback, the data bit corresponding to the transition between the current state (e.g. the encoder state at time step t=4) and the next most recent state (e.g. the state at time step t=3) is stored in the memory 131. Control passes back to block 210. Otherwise, if at least one traceback has already occurred for the data frame, control passes to block 270.

In block 270, the decoder 130 performs a partial traceback; in the preferred embodiment, the partial traceback traces back one time step. Control passes to block 280, which compares the finishing state of the partial traceback (e.g. the state at time step t=for a traceback beginning at time t=5) to the initial state of the most previous traceback (e.g. the traceback that began at time step t=). If these quantities are not equal, control passes back to block 260, and a "normal" traceback is performed (beginning from the end of the partial traceback).

If these quantities are equal, control passes to block 290, where the L−1 bits stored from the previous traceback are designated as the L−1 final bits of the current traceback. In other words, the current traceback bits are taken to be the concatenation of (a) the bit corresponding to the first encoder transition of the current traceback; with (b) the L−1 final bits of the previous traceback. The last bit stored from the previous traceback (i.e. the bit corresponding to the transition from the third to last encoder state to the second to last encoder state of the previous traceback) is designated as the desired data bit for the traceback. (The transition from the third to last state to the second to last state of the previous traceback corresponds to the transition from the second to last state to the last state of the current traceback.)

Figure 4:
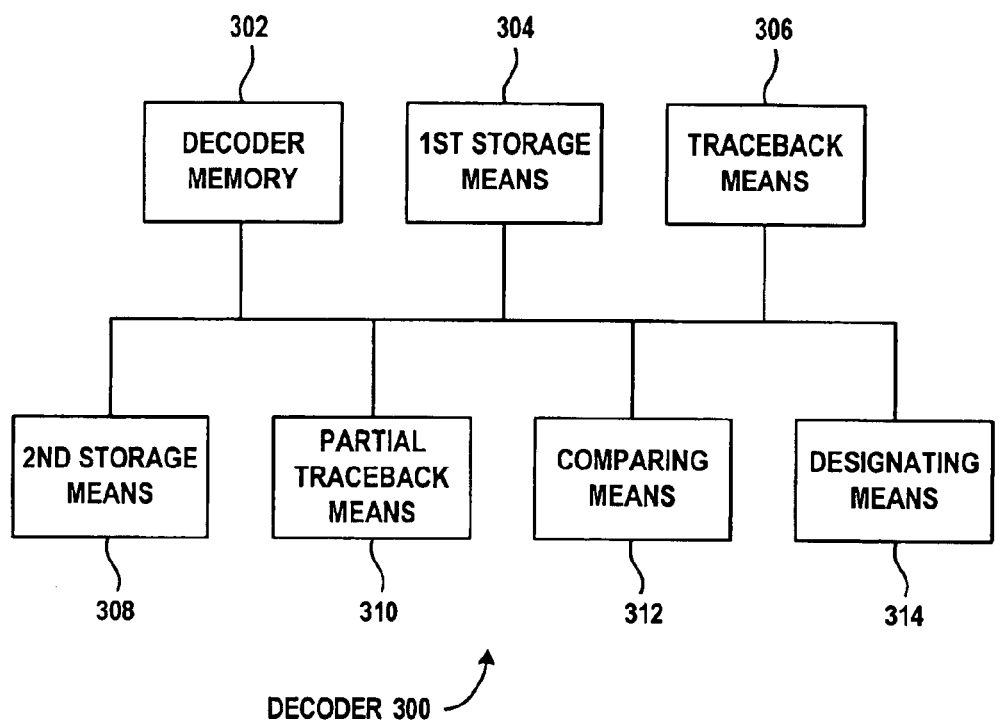
FIG. 4 is a schematic showing a decoder apparatus of the present invention.

FIG. 4 is a schematic showing a decoder in a digital communications systems. The decoder is for decoding transmitted data that has been generated by encoding a sequence of information data with a convolutional encoder that generates convolutional codes based on an input sequence of information data, the encoder characterized by a constant length K and a rate k/n. Decoder 300 includes decoder memory 302 and first storage means 304. First storage means 304 is for storing a first encoder state corresponding to a first time step. Decoder 300 also includes traceback means 306, second storage means 308, partial traceback means 310, comparing means 312 and designating means 314. Traceback means 306 are means for performing a first traceback through a plurality of time steps beginning at the first time step and to determine a first input bit corresponding to an encoder state transition from a last time step of the first traceback to a second to last time step of the first traceback. Second storage means 308 store in the decoder memory a first possible input data bit corresponding to a transition from an encoder state at a third time step within the first traceback, to an encoder state at a fourth time step within the first traceback, when neither the third nor fourth time steps are the last time step. Partial traceback means 310 perform a second traceback beginning at a second time step and encompassing the first time step, to determine a second encoder at the first time step. Comparing means 312 compare the first encoder state with the second encoder state.

Designating means 314 designate the first possible input data bit as a decoded data-bit corresponding to a transition from the encoder state at the third time step to the encoder state at the fourth time step, if the first encoder state is equal to the second encoder state.

Conclusion

Numerous variations and modifications will become apparent to those skilled in the art once the above disclosure is fully appreciated. It is intended that the following claims be interpreted to embrace all such variations and modifications.

What is claimed is:

1. A method for decoding transmitted data that has been generated by encoding a sequence of information data with a convolutional encoder that generates convolutional codes based on an input sequence of information data, the encoder characterized by a constraint length K and a data rate k/n, wherein K, k and n are integers the method employing a decoder memory, the method comprising the steps of:

(a) storing a first encoder state corresponding to a first time step;

(b) beginning at the first time step, performing a first traceback through a plurality of time steps, thereby determining a first input bit corresponding to an encoder state transition from the last time step of the first traceback to the second to last time step of the first traceback;

(c) storing in the decoder memory a first possible input data bit corresponding to a transition from an encoder state at a third time step within the first traceback, to an encoder state at a fourth time step within the first traceback, where neither the third nor fourth time steps are the last time step;

(d) performing a second traceback beginning at a second time step and encompassing the first time step, thereby determining a second encoder state at the first time step;

(e) comparing the first encoder state with the second encoder state; and (f) if the first encoder state is equal to the second encoder state, designating the first possible input data bit as a decoded data bit corresponding to the transition from the encoder state at the third lime step to the encoder state at the fourth time step.

2. The method of claim 1 wherein the second time step is the next time step after the first time step.

3. The method of claim 1 wherein the third time step is the next time step after the second time step.

4. The method of claim 1 wherein the second traceback ends at the first time step.

5. The method of claim 1 wherein the second traceback traces back through one time step.

6. The method of claim 1 further comprising the steps of storing in the decoder memory, for each transition within the first traceback, a possible input data bit corresponding to the transition, thereby storing a plurality of possible input data bits in addition to the first possible input data bit.

7. A digital communications system including a decoder for decoding transmitted data that has been generated by encoding a sequence of information data with a convolutional encoder that generates convolutional codes based on an input sequence of information data, the encoder characterized by a constraint length K and a data rate k/n, wherein K, k and n are integers the decoder comprising:

(a) a decoder memory;

(b) first storage means for storing a first encoder state corresponding to a first time step;

(c) traceback means for performing a first traceback through a plurality of time steps beginning at the first time step, to determine a first input bit corresponding to an encoder state transition from a last time step of the first traceback to a second to last time step of the first traceback;

(d) second storage means for storing in the decoder memory a first possible input data bit corresponding to a transition from an encoder state at a third time step within the first traceback, to an encoder state at a fourth time step within the first traceback, where neither the third nor fourth time steps are the last time step;

(e) partial traceback means for performing a second traceback beginning at a second time step and encompassing the first time step to determine a second encoder state at the first time step;

(f) comparing means for comparing the first encoder state with the second encoder state; and (g) means for designating the first possible input data bit as a decoded data bit corresponding to a transition from the encoder state at the third time step to the encoder state at the fourth time step, if the first encoder state is equal to the second encoder state.

8. The digital communications system including a decoder as in claim 7, further comprising third storage means for storing in the decoder memory a plurality of further possible input data bits, each corresponding to a transition in the first traceback.

9. A method for decoding transmitted data that has been generated by encoding a sequence of information data with a convolutional encoder that generates convolutional codes based on an input sequence of information data, the encoder characterized by a constraint length K and a data rate k/n, wherein K, k and n are integers the method employing a decoder memory, the method comprising the steps of:

(a) storing a first encoder state corresponding to a first time step;

(b) beginning at the first time step, performing a traceback through a plurality of L time steps, wherein L is an integer;

(c) storing in the decoder memory a plurality of L−1 data bits corresponding to transitions between adjacent time steps within the traceback;

(d) performing a partial traceback beginning at a second time step, encompassing the first time step, and through less than all of said plurality of L time steps, thereby determining a second encoder state at the first time step;

(e) comparing the first encoder state with the second encoder state; and (f) if the first encoder state is equal to the second encoder state, storing the L−1 data bits as valid data bits.

10. The method of claim 9, wherein said storing in the decoder memory the plurality of L−1 data bits includes storing a first possible input data bit corresponding to a transition between an encoder state at a second time step within the traceback, to an encoder state at a third time step within the traceback, neither the second nor third time steps being the last time step of the traceback, and said storing the plurality of L−1 data bits as valid data bits includes designating the first possible input data bit as a decoded data bit.

* * * * *